US012750573B2

(12) United States Patent
Chen et al.

(10) Patent No.: US 12,750,573 B2
(45) Date of Patent: Sep. 29, 2026

(54) INTEGRATED LENS BARREL, OPTICAL CAMERA LENS, CAMERA MODULE AND ASSEMBLY METHOD THEREOF

(71) Applicant: NINGBO SUNNY OPOTECH CO., LTD., Zhejiang (CN)

(72) Inventors: Zhenyu Chen, Zhejiang (CN); Kailun Zhou, Zhejiang (CN); Shuijia Chu, Zhejiang (CN); Heng Jiang, Zhejiang (CN); Lin Liu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 817 days.

(21) Appl. No.: 17/283,681

(22) PCT Filed: Aug. 19, 2019

(86) PCT No.: PCT/CN2019/101274

§ 371 (c)(1),
(2) Date: Apr. 8, 2021

(87) PCT Pub. No.: WO2020/073735

PCT Pub. Date: Apr. 16, 2020

(65) Prior Publication Data

US 2021/0352196 A1 Nov. 11, 2021

(30) Foreign Application Priority Data

Oct. 9, 2018 (CN) ......................... 201811171784.9
Oct. 9, 2018 (CN) ......................... 201821631668.6

(51) Int. Cl.

| | |
|---|---|
| ***G02B 7/02*** | (2021.01) |
| ***G03B 17/12*** | (2021.01) |
| ***H04N 23/55*** | (2023.01) |

(52) U.S. Cl.
CPC ............. *H04N 23/55* (2023.01); *G02B 7/021* (2013.01); *G02B 7/023* (2013.01); *G02B 7/025* (2013.01); *G03B 17/12* (2013.01)

(58) Field of Classification Search
CPC ........ G02B 7/021; G02B 7/022; G02B 7/023; G02B 7/026; G02B 7/02; B29D 11/00;
(Continued)

(56) References Cited

U.S. PATENT DOCUMENTS 5,754,350 A * 5/1998 Sato ...................... G02B 7/026 396/529
2011/0058265 A1 3/2011 Chang et al.
(Continued)

FOREIGN PATENT DOCUMENTS

CN 201083870 7/2008
CN 102023361 4/2011
(Continued)

OTHER PUBLICATIONS

Extended European Search Report issued Sep. 24, 2021 in corresponding European Patent Application No. 19870780.4.
(Continued)

*Primary Examiner* — Marin Pichler
(74) *Attorney, Agent, or Firm* — Wenderoth, Lind & Ponack, L.L.P.

(57) ABSTRACT

The present application provides an integrated lens barrel including: a cylindrical body having an inner side surface and a central axis; and an inner extension portion extending from the inner side surface to the central axis and the middle of the inner extension portion having a light through hole, the inner extension portion dividing the inner side surface into a first section and a second section, and a top surface of the inner extension portion and the first section forming a first groove suitable for accommodating a first lens group,
(Continued)

and a bottom surface of the inner extension portion and the second section forming a second groove suitable for accommodating a second lens group. The present application also provides a corresponding optical camera lens, a camera module, and corresponding assembly methods of optical camera lens and camera module. The present application can reduce source of variation of an optical camera lens based on an active calibration process, thereby improving the imaging quality and yield.

4 Claims, 7 Drawing Sheets

(58) Field of Classification Search
CPC ........ B29D 11/00403; B29D 11/00413; B29D 11/00932; H04N 23/55; G03B 17/12
USPC ................. 359/819, 821, 830, 796, 808, 811
See application file for complete search history.

(56) References Cited

U.S. PATENT DOCUMENTS

| | | | | |
|---|---|---|---|---|
| 2015/0065797 | A1 | 3/2015 | Yamamoto | |
| 2018/0372984 | A1* | 12/2018 | Shirotori | G02B 7/021 |
| 2019/0049737 | A1 | 2/2019 | Terai et al. | |
| 2019/0235140 | A1* | 8/2019 | Chou | G02B 7/022 |

FOREIGN PATENT DOCUMENTS

| | | |
|---|---|---|
| CN | 104363814 | 2/2015 |
| CN | 205594216 | 9/2016 |
| CN | 206906673 | 1/2018 |
| CN | 207249220 | 4/2018 |
| CN | 207340018 | 5/2018 |
| CN | 207408652 | 5/2018 |
| CN | 207502788 | 6/2018 |
| CN | 209387954 | 9/2019 |
| JP | 2013-205808 | 10/2013 |
| JP | 2018-146878 | 9/2018 |
| KR | 10-2014-0076761 | 6/2014 |
| TW | 200846736 | 12/2008 |

OTHER PUBLICATIONS

International Search Report issued Nov. 19, 2019 in International (PCT) Application No. PCT/CN2019/101274.

* cited by examiner

INTEGRATED LENS BARREL, OPTICAL CAMERA LENS, CAMERA MODULE AND ASSEMBLY METHOD THEREOF

CROSS REFERENCES TO RELEVANT APPLICATIONS

The present application claims the priority and rights of the Chinese patent application No. 201811171784.9 entitled "Integrated Lens Barrel, Optical Camera Lens, Camera Module And Assembly Method Thereof" filed with the China National Intellectual Property Administration (CNIPA) on Oct. 9, 2018; and Chinese utility model patent application No. 201821631668.6 entitled "Integrated Lens Barrel, Optical Camera Lens and Camera Module" filed with the China National intellectual Property Administration (CNIDA) on Oct. 9, 2018, both of which are incorporated herein by reference in their entireties.

TECHNICAL FIELD

The present application relates to field of optical imaging technology. Specifically, this application relates to an integrated lens barrel, an optical camera lens, a camera module and an assembly method thereof.

BACKGROUND

With the development of mobile phones, computers and other terminals, the various requirements of users have been greatly improved, especially with the development of mobile phones, users' pursuit of shooting quality has led manufacturers to develop personalized and customized camera modules, such as a camera lens with a large aperture, a large wide angle, and a large number of lenses that solve aberrations. On one hand, this makes the optical design more and more complex; on the other hand, the complex optical system is more sensitive, which raises big challenge to the manufacturing yield and product quality. Because the optical system of a camera module with a large aperture and a large wide angle is more sensitive, the reliability of its manufacturing process and verification process will be more fragile than conventional designs. Therefore, now there is a need for an optical camera lens with a better structure.

On the other hand, in order to meet the more and more extensive market requirements, high pixels, small size, and large aperture are the irreversible development trends of existing camera modules. However, it is very difficult to achieve the three requirements of high pixels, small size, and large aperture in a same camera module. For example, the compact development of mobile phones and the increase in the proportion of mobile phone screens have made a space for a front camera module inside the mobile phone smaller and smaller. However, the market has proposed higher and higher requirements for imaging quality of camera module.

In the field of compact camera modules (for example, camera modules for mobile phones), it is often necessary to consider the quality of an optical imaging camera lens and the manufacturing errors in the module assembling process. Specifically, in the manufacturing process of an optical imaging camera lens, the factors affecting the resolution of the camera lens come from errors of each element and its assembly, an error of a thickness of a lens spacer element, an error of assembly fitting of each camera lens, and a change of refractive index of the camera lens material, etc. Because there are many factors that affect the resolution of the camera lens, which exist in multiple elements, the control of each factor has a limit of manufacturing accuracy. If only the accuracy of each element is improved, the improvement ability is limited, the improvement cost is high, and it cannot meet market's increasing requirements for image quality.

The applicant proposes an assembly method, which includes: adjusting and determining a relative position of upper and lower sub-lens based on an active calibration process, and then bonding the upper and lower sub-lens together according to the determined relative position, thereby manufacturing a complete optical camera lens or camera module. This solution can improve the process capability index (CPK) of mass-produced optical camera lenses or camera modules; it can loosen the requirements for the accuracy of each element of the material (such as the sub-lens or photosensitive assembly used to assemble optical camera lenses or camera modules) and its assembly accuracy, thereby reducing an overall cost of the optical imaging camera lens and camera module; it can adjust various aberrations of the camera module in real time during the assembly process, thereby reducing defective rate, reducing production costs, and improving imaging quality.

However, actively calibrating an optical system of a camera lens itself is a new production process, in actual mass production, it is necessary to consider many factors such as the reliability, drop resistance, weather resistance and production cost of the optical camera lens and camera module, and sometimes it is necessary to face a decline in yield caused by various unpredictable factors. The applicant believes that improving the structural reliability of optical camera lenses manufactured based on an active calibration process is an important direction for thinking about improving the imaging quality and yield of such optical camera lenses. Therefore, there is an urgent need for a solution that can improve the structural reliability of an optical camera lens manufactured based on an active calibration process.

SUMMARY OF THE INVENTION

The purpose of the present application is to provide a solution that can overcome at least one defect of the prior art.

According to an aspect of the present application, there provides an integrated lens barrel, characterized by comprising: a cylindrical body having an inner side surface and a central axis; and an inner extension portion, wherein the inner extension portion extends from the inner side surface to the central axis and the middle of the inner extension portion has a light through hole, and the inner extension portion divides the inner side surface into a first section and a second section, and a top surface of the inner extension portion and the first section constitute a first groove suitable for accommodating a first lens group, and a bottom surface of the inner extension portion and the second section constitute a second groove suitable for accommodating a second lens group.

Wherein, the first section has a closed ring shape in a top view.

Wherein, the first section has a concave segment, and the concave segment is recessed from the inner side surface of the cylindrical body to the outer side surface of the cylindrical body.

Wherein, the first section has a notched ring shape in a top view.

Wherein, the top surface of the inner extension portion is suitable for arranging glue material.

Wherein, the second section has multiple steps, and the multiple steps are suitable for successively embedding multiple second lenses to assemble the second lens group; and the bottom surface of the inner extension portion is suitable for bearing the second lens group, and the top surface of the inner extension portion is suitable for arranging glue material to bond the first lens group.

According to another aspect of the present application, there also provides an optical camera lens, characterized by comprising: an integrated lens barrel including a cylindrical body having an inner side surface and a central axis; and an inner extension portion, wherein the inner extension portion extends inward from the inner side surface and the middle of the inner extension portion has a light through hole, and the inner extension portion divides the inner side surface into a first section and a second section, and a top surface of the inner extension portion and the first section constitute a first groove, and a bottom surface of the inner extension portion and the second section constitute a second groove; a first lens group including a single first lens or multiple first lenses assembled together by integrating or bonding between lenses; a second lens group including at least one second lens, the second lens group bearing against the bottom surface of the inner extension portion and being placed in the second groove, and the first lens group and the first lens group together forming an imageable optical system; and a first glue material located between the first lens group and the first groove.

Wherein, the cured first glue material supports and fixes the first lens group and the integrated lens barrel, so that a relative position of the first lens group and the second lens group is maintained at a relative position determined by an active calibration based on an imaging result of the optical system.

Wherein, the first section has a closed ring shape in a top view.

Wherein, the first section has a concave segment, and the concave segment is recessed from the inner side surface of the cylindrical body to the outer side surface of the cylindrical body.

Wherein, the top surface of the cylindrical body is bonded with a light shielding plate, and the light shielding plate forms a diaphragm, and no glue material is filled between the light shielding plate and the first lens group.

Wherein, the first lens group includes an optical region and a structural region surrounding the optical region, the top surface of the structural region is bonded with a light shielding plate, the light shielding plate forms a diaphragm, and no glue material is filled between the light shielding plate and the top surface of the cylindrical body.

Wherein, the first section has a notched ring shape in a top view.

Wherein, the top surface of the cylindrical body is bonded with a light shielding plate to form a diaphragm, the light shielding plate has a side baffle that fits the notch, and no glue material is filled between the light shielding plate and the first lens group.

Wherein, the first lens group includes an optical region and a structural region surrounding the optical region, the top surface of the structural region is bonded with a light shielding plate to form a diaphragm, the light shielding plate has a side baffle that fits the notch, and no glue material is filled between the light shielding plate and the top surface of the cylindrical body.

Wherein, the light shielding plate is made of metal material or a material suitable for appearance surface.

Wherein, the light shielding plate is made of the same material as the integrated lens barrel, and the material for bonding the light shielding plate is the same as that of the first glue material.

Wherein, the first lens group includes an optical region and a structural region surrounding the optical region, the outer surface of the structural region is attached with a light shielding layer, and the top surface of the structural region is higher than the top surface of the integrated lens barrel.

Wherein, the light shielding layer shields visible light and transmits invisible light in a specific wavelength band, and the invisible light in the specific wavelength band is the light that triggers the curing reaction of the first glue material.

Wherein, the second section has multiple steps, and the multiple steps are suitable for successively embedding multiple second lenses to assemble the second lens group.

Wherein, the cylindrical body and the inner extension portion are integrally molded.

According to another aspect of the present application, there also provides a camera module, characterized by comprising any of the aforementioned optical camera lens.

According to another aspect of the present application, there also provides an assembly method of an optical camera lens, characterized by comprising: mounting a second lens group in an integrated lens barrel to constitute a second camera lens component, wherein the integrated lens barrel includes a cylindrical body and an inner extension portion, the cylindrical body has an inner side surface and a central axis, the inner extension portion extends inwardly from the inner side surface and the middle of the inner extension portion has a light through hole, the inner extension portion divides the inner side surface into a first section and a second section, wherein a top surface of the inner extension portion and the first section constitute a first groove, a bottom surface of the inner extension portion and the second section constitute a second groove, the second lens group includes at least one second lens, the second lens group bears against the bottom surface of the inner extension portion and is placed in the second groove; placing the first lens group in the first groove, wherein the first lens group includes a single first lens or multiple first lenses assembled together by an interaction of the lenses themselves; pre-positioning the first lens group and the second camera lens component so that the first lens group and the second lens group constitute an imageable optical system; actively calibrating a relative position of the first lens group and the second lens group based on an actual measurement imaging results; and bonding the first lens group and the first groove by a first glue material, and making the relative position of the first lens group and the second lens group to be maintained at the relative position determined by the active calibration, thereby obtaining the optical camera lens.

Wherein, the first section has a closed ring shape in a top view; in the pre-positioning and the active calibration, the first lens group is clamped by a clamp to move, wherein there is a gap between the first section and the side surface of the first lens group for accommodating the clamp.

Wherein, the first section has a notched ring shape in a top view; in the pre-positioning and the active calibration, the first lens group is clamped by a clamp to move, wherein the clamp stretches into the integrated lens barrel through the notch and clamps the first lens group.

Wherein, the second section has multiple steps; mounting the second lens group in the integrated lens barrel includes: sequentially embedding the at least one second lens to the multiple steps to assemble the second lens group, and forming the second camera lens component.

Wherein, in the step of bonding the first lens group and the first groove by a first glue material, the first glue material is only arranged between a bottom surface of the first lens group and the top surface of the inner extension portion; or the first glue material is not only arranged between the bottom surface of the first lens group and the top surface of the inner extension portion, but also arranged between the side surface of the first lens group and the first section.

Wherein, the first lens group includes an optical region and a structural region surrounding the optical region; the assembly method of optical camera lens further includes: adhering a light shielding plate to a top surface of the structure region, and no glue material is filled between the light shielding plate and a top surface of the cylindrical body.

Wherein, the assembly method of optical camera lens further includes: adhering a light shielding plate to a top surface of the cylindrical body, and no glue material is filled between the light shielding plate and a top surface of the first lens group.

Wherein, the light shielding plate is adhered after bonding the first lens group and the first groove by the first glue material.

Wherein, bonding the first lens group and the first groove by the first glue material includes the steps of glue arranging, exposure and baking performed successively; the step of adhering the light shielding plate is performed after the step of exposure and before the step of baking.

According to another aspect of the present application, there also provides an assembly method of camera module, characterized by comprising: assembling an optical camera lens using any of the aforementioned assembly method of optical camera lens; and assembling a camera module based on the optical camera lens.

Compared with prior art, this application has at least one of the following technical effects:

1. The present application can reduce source of variation of an optical camera lens based on an active calibration process, thereby improving the imaging quality and yield.

2. In the present application, an integrated lens barrel can be used instead of a split lens barrel, which provides high mechanical reliability of an optical camera lens based on an active calibration, and can suppress variation of optical performance caused by baking, high temperature and high humidity conditions.

3. In the present application, a light shielding layer that does not transmit visible light and can transmit invisible light in a specific wavelength band can be attached to the first lens group, so that an exposure can be performed from directly above when the glue material is cured, and this exposure manner is more uniform than a side exposure, which helps to improve the imaging quality of the optical camera lens.

4. In the present application, a light shielding plate of metal material can be used to reduce the height of an optical camera lens or camera module.

5. In the present application, a light shielding plate can be used as an appearance surface to reduce the height of an optical camera lens or camera module and reducing the assembly process.

BRIEF DESCRIPTION OF THE DRAWINGS

Exemplary examples are shown in the referenced drawings. The examples and drawings disclosed herein should be regarded as illustrative rather than restrictive.

DETAILED DESCRIPTION OF EMBODIMENTS

Figure 1:
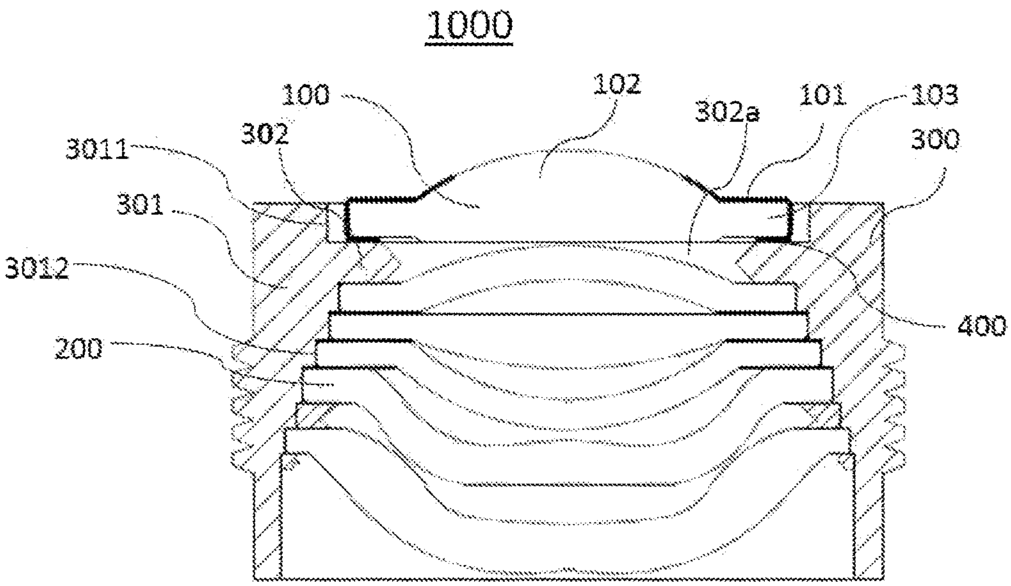
FIG. 1 shows a cross-sectional schematic view of an optical camera lens 1000 in one embodiment of the present application.

In order to better understand the present application, various aspects of the present application will be described in more detail with reference to the drawings. It should be understood that these detailed descriptions are only descriptions of exemplary embodiments of the present application, and are not intended to limit the scope of the present application in any way. Throughout the specification, the same reference numerals refer to same elements. The expression "and/or" includes any and all combinations of one or more of the associated listed items.

It should be noted that in this specification, expressions such as first, second, etc. are only used to distinguish one feature from another feature, and do not represent any restriction on the feature. Therefore, without departing from the teaching of the present application, the first subject discussed below may also be referred to as the second subject.

In the drawings, the thickness, size, and shape of objects have been slightly exaggerated for ease of description. The drawings are only examples and are not drawn strictly to scale.

It should also be understood that the ten is "including", "includes", "having", "containing" and/or "contains", when used in this specification, mean that the stated features, bodies, steps, operations, elements and/or components exists, but does not exclude the presence or addition of one or more other features, bodies, steps, operations, elements, components and/or their combinations. In addition, when expressions such as "at least one of" appear after the list of listed features, the entire listed feature is modified instead of individual elements in the list. In addition, when describing the embodiments of the present application, the use of "may" means "one or more embodiments of the present application". And, the term "exemplary" is intended to refer to an example or illustration.

As used herein, the terms "substantially", "approximately", and similar terms are used as approximate terms, not as terms representing degree, and are intended to illustrate the inherent deviation in the calculated value or the measurement that will be recognized by those skilled in the art.

Unless otherwise defined, all terms (including technical terms and scientific terms) used herein have the same meanings as commonly understood by those skilled in the art to which this application belongs. It should also be understood that terms (such as those defined in commonly used dictionaries) should be interpreted as having meanings consistent with their meanings in the context of related technologies, and will not be interpreted in an idealized or excessively formal sense unless this is clearly defined in this article.

It should be noted that the embodiments in this application and the features in the embodiments can be combined with each other if there is no conflict. Hereinafter, the present application will be described in detail with reference to the drawings and in conjunction with embodiments.

Figure 2:
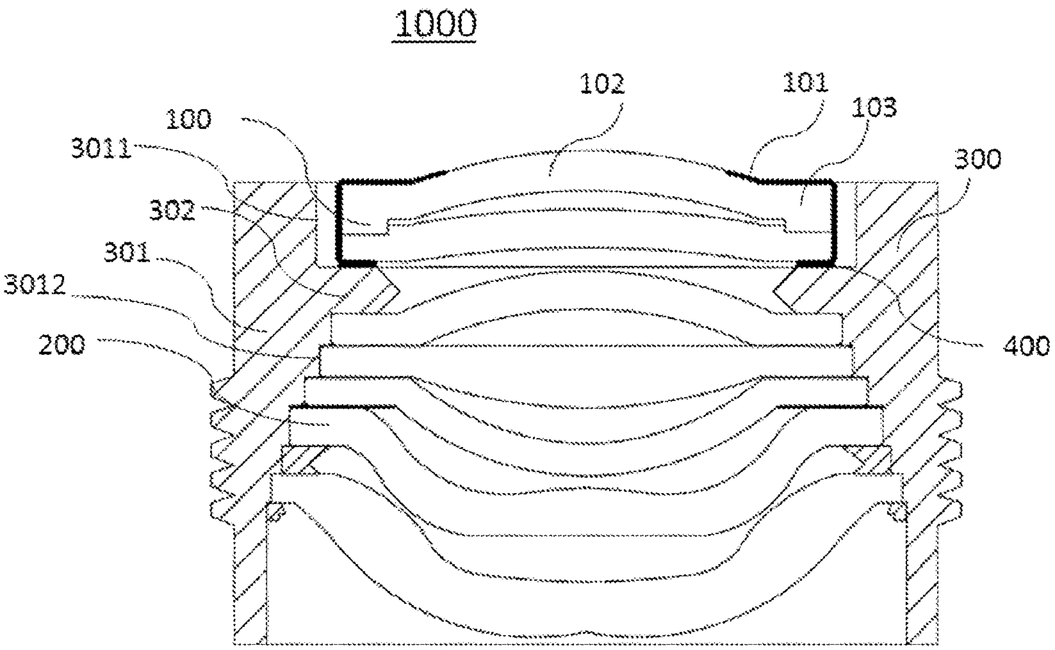
FIG. 2 shows a cross-sectional schematic view of an optical camera lens 1000 in another embodiment of the present application.

FIG. 1 shows a cross-sectional schematic view of an optical camera lens 1000 in one embodiment of the present application. As shown in FIG. 1, the optical camera lens 1000 in this embodiment includes an integrated lens barrel 300, a first lens group 100, a second lens group 200 and a first glue material 400. Wherein, the integrated lens barrel 300 includes a cylindrical body 301 and an inner extension portion 302 formed by extending from an inner side surface of the cylindrical body 301. The cylindrical body 301 and the inner extension portion 302 are integrally formed. Further, referring to FIG. 1, the cylindrical body 301 has an inner side surface and a central axis. The inner extension portion 302 extends from the inner side surface to the central axis and has a light through hole 302*a* in the middle thereof. The inner extension portion 302 divides the inner side surface into a first section 3011 and a second section 3012, wherein the top surface of the inner extension portion 302 and the first section 3011 form a first groove, and the bottom surface of the inner extension portion 302 and the second section 3012 form a second groove. In this embodiment, the first lens group 100 is formed by a single first lens. It should be noted that the present application is not limited to this. For example, FIG. 2 shows a cross-sectional schematic view of an optical camera lens 1000 in another embodiment of the present application. In this embodiment, the first lens group 100 can be formed by multiple first lenses assembled together by an interaction of the lenses themselves (for example, formed by multiple first lenses integrated or bonded to each other). The second lens group 200 includes at least one second lens. The second lens group 200 bears against the bottom surface of the inner extension portion 302 and is placed in the second groove, the first lens group 100 and the second lens group 200 together form an imageable optical system. The first glue material 400 is located between the first lens group 100 and the first groove. The first glue material 400 is suitable for supporting and fixing the first lens group 100 and the integrated lens barrel 300 after being cured, so that a relative position of the first lens group 100 and the second lens group 200 is maintained at a relative position determined by an active calibration based on the imaging result of the optical system.

Figure 3:
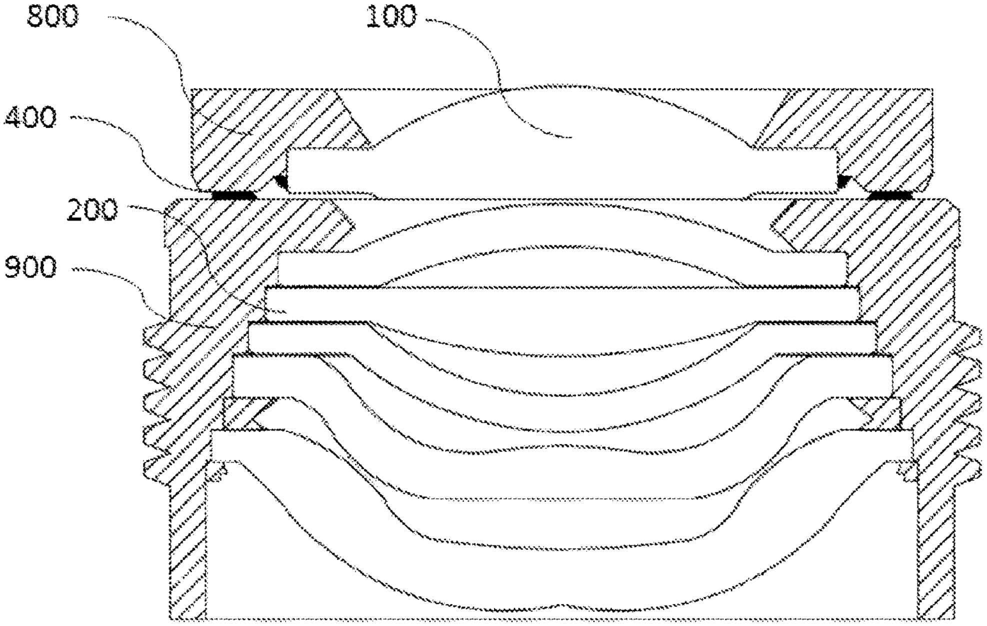
FIG. 3 shows an optical camera lens based on an active calibration using a split lens barrel in a comparative example.

In the above embodiment, the integrated lens barrel 300 is used instead of the split lens barrel, which provides high mechanical reliability of the optical camera lens based on the active calibration, and can suppress the variation of optical performance caused by baking, high temperature and high humidity conditions (due to reducing of source of variation under baking and other conditions). Further, FIG. 3 shows an optical camera lens based on an active calibration using a split lens barrel in a comparative example. Referring to FIG. 3, the optical camera lens includes a first camera lens component and a second camera lens component, wherein the first camera lens component includes a first lens barrel 800 and a first lens mounted in the first lens barrel 800, and the second camera lens component includes a second lens barrel 900 and multiple second lenses mounted in the second lens barrel 900. The first camera lens component and the second camera lens component are each calibrated as a whole and a relative position of the two is determined, and then the first camera lens component and the second camera lens component are bonded by the first glue material 400 to support and fix the first camera lens component and the second camera lens component. Under this scheme, a structural strength of the lens barrel (especially the first lens barrel 800) is relatively insufficient, resulting in low mechanical reliability. Under baking, high temperature and high humidity conditions, both the first glue material 400 and the lens barrel (especially the first lens barrel 800) may vary, resulting the relative position of the first lens and the second lens to change, thereby losing (or reducing) the optical performance obtained by the active calibration (that is, the optical performance variation). The integrated lens barrel 300 used in the present application can overcome the above-mentioned problems.

Figure 4:
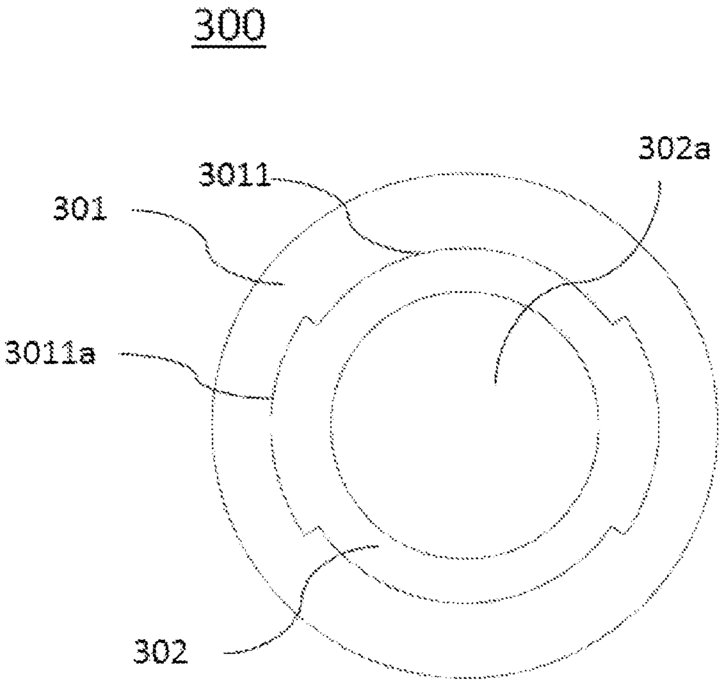
FIG. 4 shows a top schematic view of an integrated lens barrel 300 in one embodiment of the present application.
Figure 5:
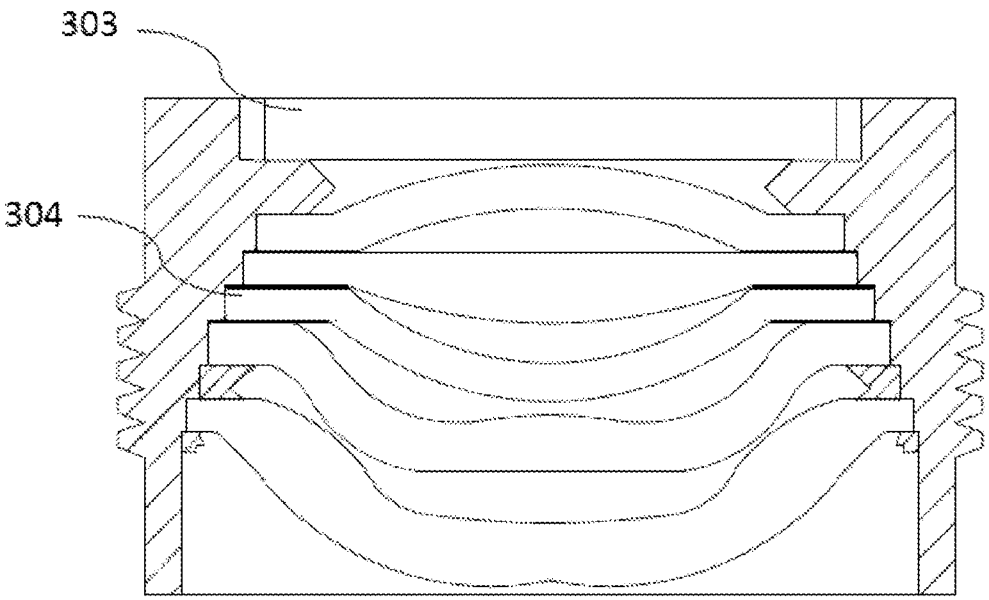
FIG. 5 shows a cross-sectional schematic view of the integrated lens barrel 300 shown in FIG. 4.

Further, FIG. 4 shows a top schematic view of an integrated lens barrel 300 in one embodiment of the present application. Referring to FIG. 4, in one embodiment of the present application, the first section 3011 has a closed ring shape in a top view. The first section 3011 has a concave segment 3011*a*, and the concave segment 3011*a* is recessed from the inner side surface of the cylindrical body 301 to the outer side surface of the cylindrical body 301. FIG. 5 shows a cross-sectional schematic view of the integrated lens barrel 300 shown in FIG. 4. Referring to FIG. 1, FIG. 4 and FIG. 5, it can be seen that the first section 3011 of the inner side surface of the integrated lens barrel 300 has a concave segment 3011*a*, and there is a gap between the concave segment 3011*a* and the outer side surface of the first lens group 100, and the gap can accommodate a clamping jaw so that the clamping jaw clamps the first lens group 100 for actively calibration in the first groove 303. It should be noted that in FIG. 5, the second lens group 200 has been embedded to the second groove 304 of the integrated lens barrel 300.

Figure 6:
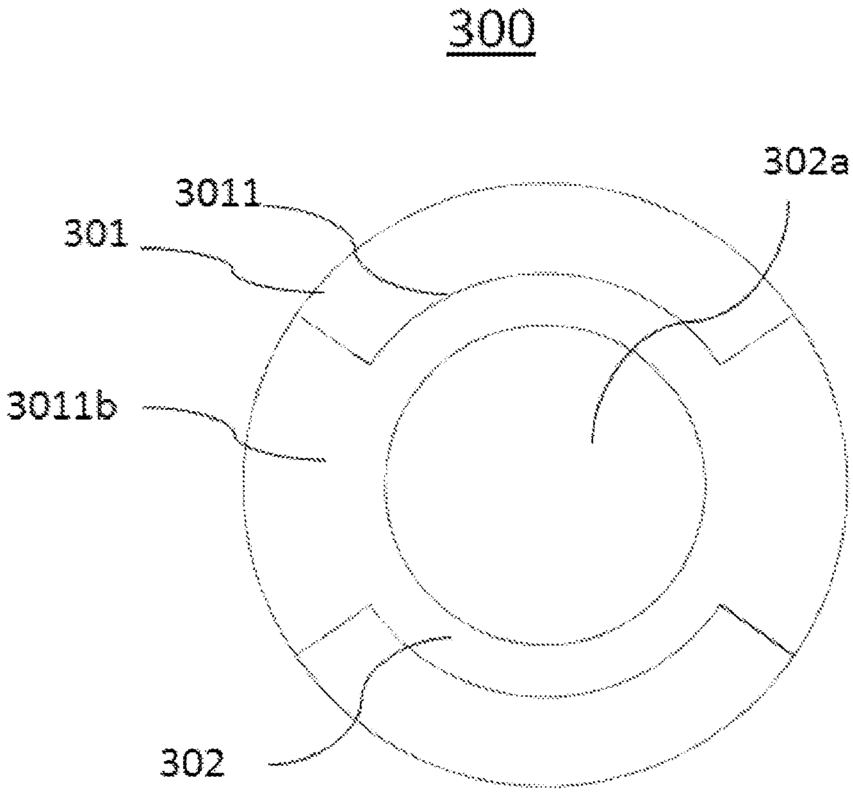
FIG. 6 shows a top schematic view of an integrated lens barrel 300 in another embodiment of the present application.
Figure 7:
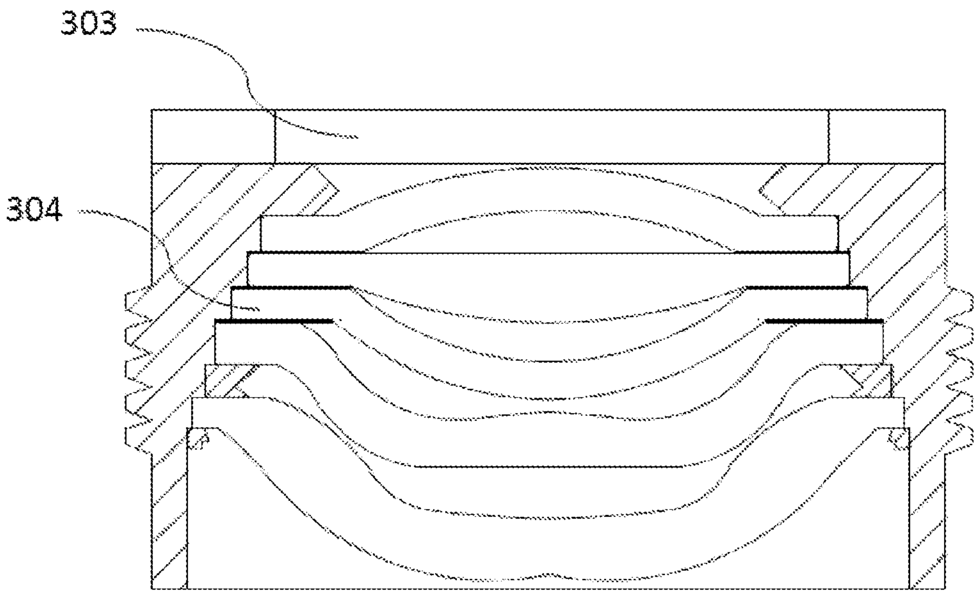
FIG. 7 shows a cross-sectional schematic view of the integrated lens barrel 300 shown in FIG. 6.
Figure 8:
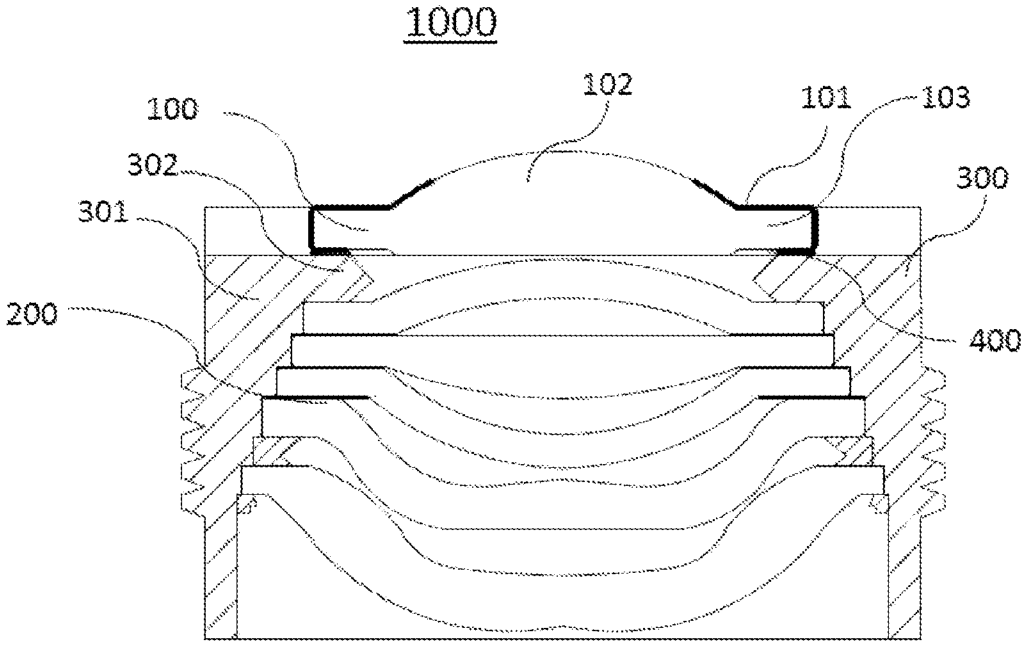
FIG. 8 shows a schematic view of an optical camera lens using an integrated lens barrel 300 shown in FIG. 6 in one embodiment of the present application.

Further, FIG. 6 shows a top schematic view of an integrated lens barrel 300 in another embodiment of the present application. Referring to FIG. 6, in another embodiment of the present application, the first section 3011 has a notched ring shape in a top view. Since the first section 3011 has a notch 3011*b*, the integrated lens barrel 300 can avoid the clamping jaw, so that the clamping jaw clamps the first lens group 100 for active calibration in the first groove. Further, FIG. 7 shows a cross-sectional schematic view of the integrated lens barrel 300 shown in FIG. 6. FIG. 8 shows a schematic view of an optical camera lens using the integrated lens barrel 300 shown in FIG. 6 in one embodiment of the present application.

Further, still referring to FIG. 1, in one embodiment of the present application, the second section 3012 has multiple steps, and the multiple steps are suitable for successively embedding multiple second lenses to assemble the second lens group 200. In other words, after the assembly is completed, the integrated camera lens and multiple second lenses form an integral second camera lens component, the first lens group 100 alone constitutes the first camera lens component, and the active calibration described above is to calibrate the relative position of the first camera lens component and the second camera lens component.

Further, still referring to FIG. 1, in one embodiment of the present application, the surface of the structural region 103 of the first lens group 100 (including the top surface and the side surface of the structural region 103, and sometimes can further include the bottom surface of the structural region 103) is attached with a light shielding layer 101. The structural region 103 is a region surrounding an optical region 102. The optical region 102 is a region of the lens group for optical imaging. The light shielding layer 101 can be a coating that does not transmit visible light but only transmits ultraviolet light. In this way, a first glue material 400 can be a glue material that is triggered by ultraviolet light to be cured. The coating (that is, the light shielding layer 101) does not transmit visible light to shield stray light or act as a diaphragm, and its structure is compact, and an exposure can be performed from directly above (that is, ultraviolet light is transmitted from the light shielding layer 101) when the glue material is cured, which is more uniform than the side exposure. In contrast, in the split lens barrel scheme of the aforementioned comparative example, due to the shielding of the upper first lens barrel 800, it is necessary to expose from the side to cure the first glue material 400. It should be noted that the first glue material 400 can also be a glue material that is triggered by other wavelength bands to be cure, and at this time, the light shielding layer 101 does not transmit visible light but only transmits light in the wavelength hands that trigger the curing of the first glue material 400.

Figure 9:
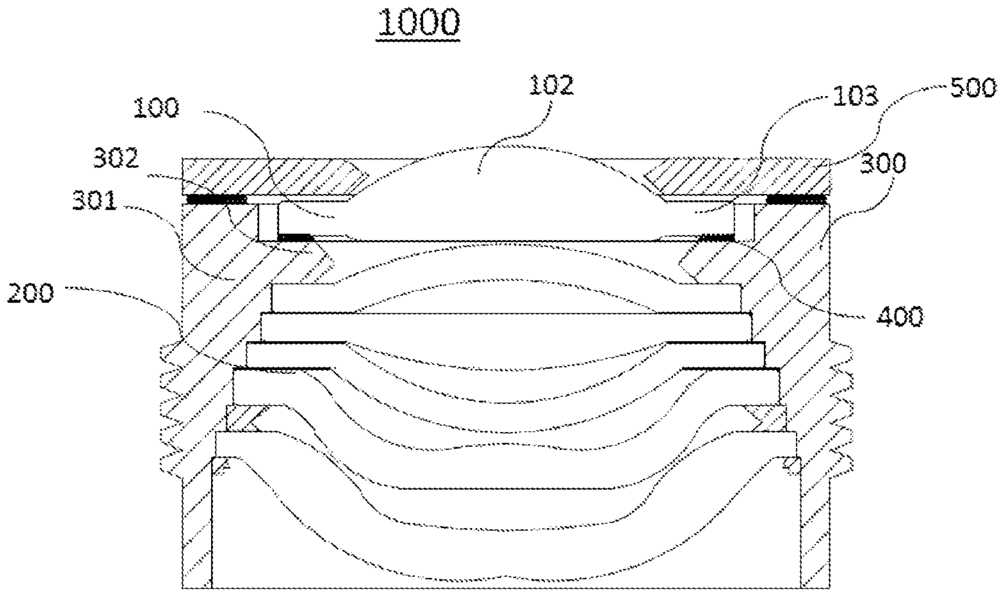
FIG. 9 shows an optical camera lens in one modified embodiment of the present application.

Further, FIG. 9 shows an optical camera lens of one modified embodiment of the present application. In this embodiment, on the basis of the embodiment in FIG. 1, a light shielding plate 500 is added. Accordingly, in this embodiment, a first lens (or a first lens group 100) can also not be attached with a light shielding layer. Specifically, in this embodiment, the light shielding plate 500 can be bonded to a top surface of an integrated lens barrel 300 (referring to a top surface of the cylindrical body 301). The light shielding plate 500 is not in contact with the first lens (a gap is left between the two, and no glue material is used for bonding). In this embodiment, the light shielding mechanism (that is, the light shielding plate 500) does not participate in the assembly process involving active calibration, therefore, there is no need for height measurement, and the surface roughness does not need to be made small to ensure high measurement accuracy, and scratches are reduced (the smoother, the easier it is to scratch). On the other hand, since the light shielding mechanism can be separated from the lenses (for comparison, in the aforementioned comparative example, the first lens barrel 800 achieves light shielding function) and it is no longer bonded to the lenses, the selection of its material is no longer limited by the lower group lens barrel (that is, the second lens barrel) (for comparison, in the aforementioned comparative example, it has been considered that the linear expansion coefficients of the two sides bonded by the glue material are close to reduce the performance variation of the optical system under conditions such as baking). Therefore, the material of the light shielding plate 500 can be metal, so that the light shielding plate 500 can be made thinner. The material of the light shielding plate 500 can also be PET polyester, which has stable mechanical and chemical properties and can be directly used as an appearance surface. For comparison, in the aforementioned comparative example, the final optical camera lens finished product needs to add a PET polyester material sheet on the outermost surface of the camera lens as the appearance surface.

Figure 10:
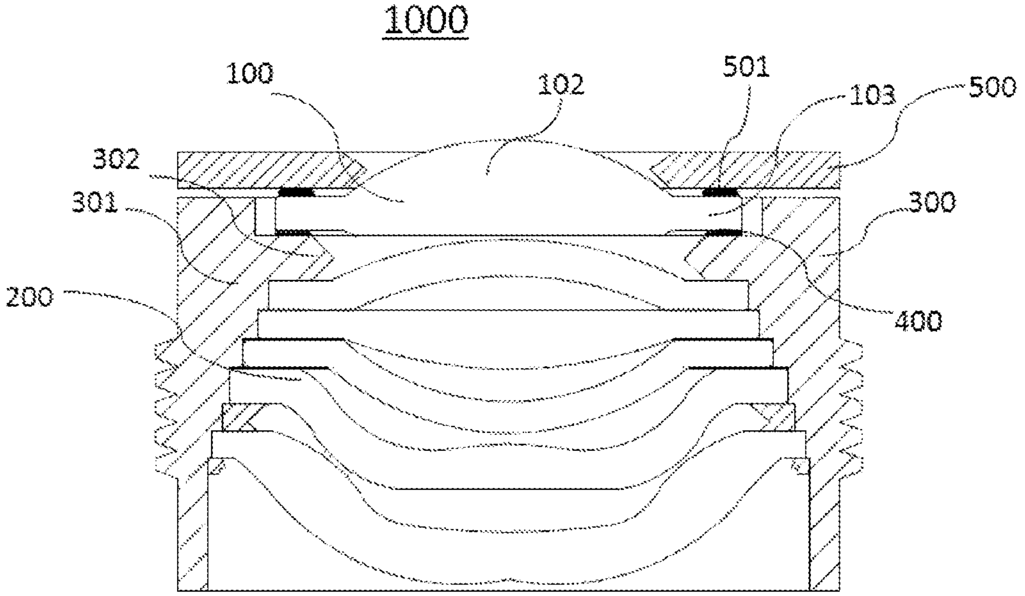
FIG. 10 shows an optical camera lens in another modified embodiment of the present application.

Further, FIG. 10 shows an optical camera lens in another modified embodiment of the present application. In this embodiment, a light shielding plate 500 is also added on the basis of the embodiment in FIG. 1. In addition, in this embodiment, a first lens (or a first lens group 100) can also not be attached with a light shielding layer. The difference with the embodiment shown in FIG. 9 is that, in this embodiment, the light shielding plate 500 is bonded to a top surface of a structural region 103 of a first lens (or a first lens group 100). However, there is an air gap between the light shielding plate 500 and a top surface of a cylindrical body 301, that is, no glue material is arranged between the two. In this embodiment, the light shielding mechanism (that is, the light shielding plate 500) does not participate in the assembly process involving active calibration, therefore, there is no need for height measurement, and the surface roughness does not need to be made small to ensure high measurement accuracy, and scratches are reduced (the smoother, the easier it is to scratch). The light shielding mechanism in this embodiment is preferably made of the same material as an integrated lens barrel 300, and a glue material is also selected from the same material as the integrated lens barrel and upper group lens, that is, a glue material 501 for bonding the light shielding mechanism is of the same material as a first glue material 400. And its purpose is to make the variation of the glue material on both sides of the first lens group 100 consistent under conditions such as baking, so as to minimize the degradation of the optical system performance as much as possible.

Figure 11:
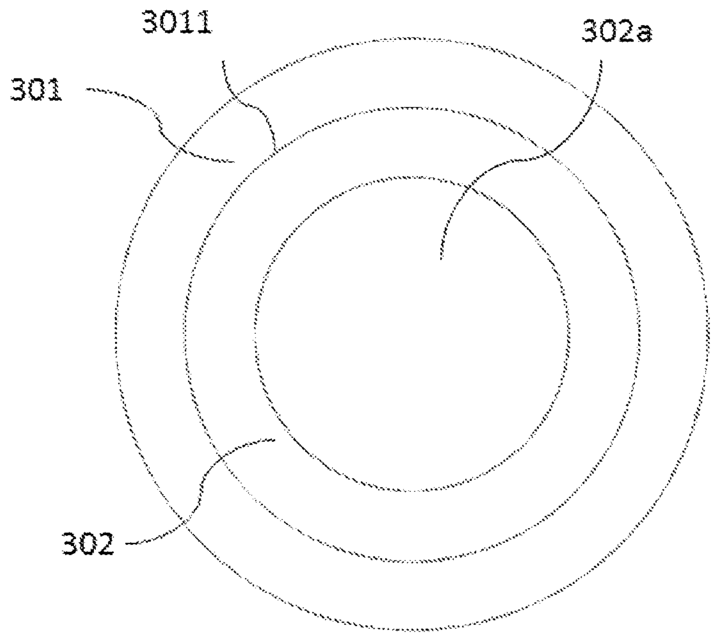
FIG. 11 shows a top schematic view of an integrated lens barrel 300 in one modified embodiment of the present application.

Further, FIG. 11 shows a top schematic view of an integrated lens barrel 300 in one modified embodiment of the present application. In this embodiment, the first section 3011 of the integrated lens barrel 300 has a ring shape and has no concave segment. In this embodiment, the diameter of the first section 3011 can be larger than the diameter of an outer side surface of a first lens (or a first lens group 100), so as to form a space for accommodating a clamping jaw between the first section 3011 and the outer side surface of the first lens (or the first lens group 100), thereby avoiding the clamping position of the clamping jaw. At a position where there is no need to avoid the clamping jaw, the outer side surface of the first lens (or the first lens group 100) can optionally being applied a glue material to bond with the integrated lens barrel 300.

Figure 12:
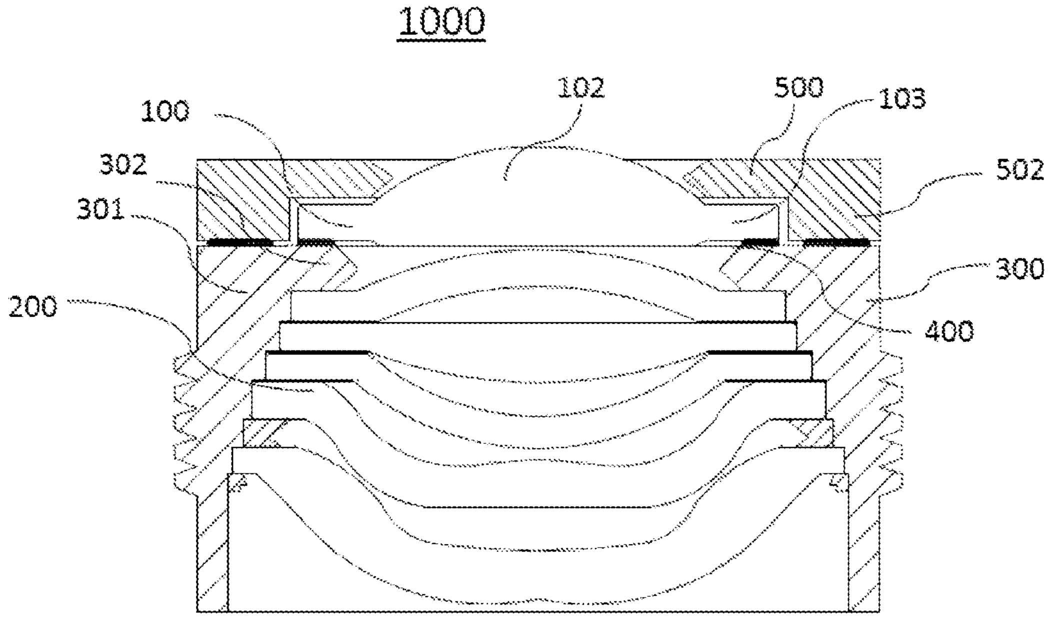
FIG. 12 shows an optical camera lens in another modified embodiment of the present application.
Figure 13:
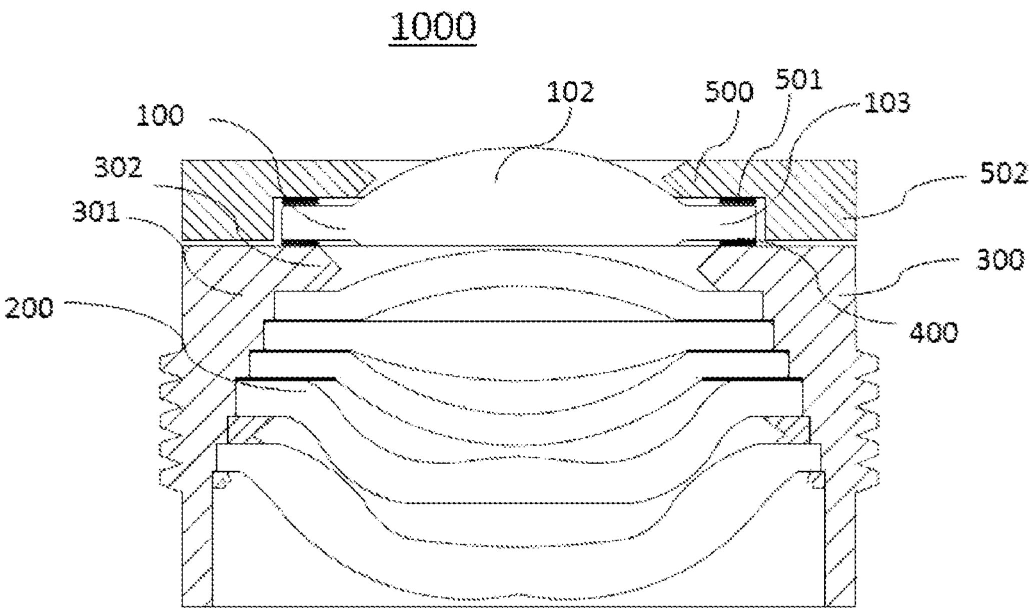
FIG. 13 shows an optical camera lens in another modified embodiment of the present application.

Further, FIG. 12 shows an optical camera lens in another modified embodiment of the present application. Compared with the embodiments shown in FIG. 6 to 8, this embodiment differs in that a light shielding plate 500 is added, and the light shielding plate 500 has a side baffle 502 adapted to a notch of a first section 3011. In this embodiment, the first lens (or the first lens group 100) can also not be attached with a light shielding layer. Specifically, in this embodiment, the light shielding plate 500 can be bonded to the top surface of a cylindrical body 301. The light shielding plate 500 is not in contact with the first lens (a gap is left between the two, and no glue material is used for bonding). In this embodiment, the light shielding mechanism (that is, the light shielding plate 500) does not participate in the assembly process involving active calibration, therefore, there is no need for height measurement, and the surface roughness does not need to be made small to ensure high measurement accuracy, and scratches are reduced. On the other hand, since the light shielding mechanism can be separated from the lenses and it is no longer bonded to the lenses, the selection of its material is no longer limited by the lower group lens barrel (that is, the second lens barrel). Therefore, the material of the light shielding plate 500 can be metal, so that the light shielding plate 500 can be made thinner. The material of the light shielding plate 500 can also be PET polyester, which has stable mechanical and chemical properties and can be directly used as an appearance surface. For comparison, in the aforementioned comparative example, the final optical camera lens finished product needs to add a PET polyester material sheet on the outermost surface of the camera lens as the appearance surface.

Further, FIG. 1.3 shows an optical camera lens in another modified embodiment of the present application. Compared with the embodiments shown in FIGS. 6 to 8, this embodiment differs in that a light shielding plate 500 is added, and the light shielding plate 500 has a side baffle 502 adapted to a notch of a first section 3011. In this embodiment, the first lens (or the first lens group 100) can also not be attached with a light shielding layer. The difference with the embodiment shown in FIG. 12 is that, in this embodiment, the light shielding plate 500 is bonded to a top surface of a structural region 103 of a first lens (or a first lens group 100). There is an air gap between the light shielding plate 500 and a top surface of a cylindrical body 301, that is, no glue material is arranged between the two. In this embodiment, the light shielding mechanism (that is, the light shielding plate 500) does not participate in the assembly process involving active calibration, therefore, there is no need for height measurement, and the surface roughness does not need to be made small to ensure high measurement accuracy, and scratches are reduced (the smoother, the easier it is to scratch). The bonded light shielding mechanism in this embodiment is preferably made of the same material as an integrated lens barrel 300, and a glue material is also selected from the same material as the integrated lens barrel and upper group lens, that is, a glue material 501 for bonding the light shielding mechanism is of the same material as a first glue material 400. And its purpose is to make the variation of the glue material on both sides of the first lens group 100 consistent under conditions such as baking, so as to minimize the degradation of the optical system performance as much as possible.

Further, in one embodiment, the top surface of the inner extension portion 302 is suitable for arranging glue material, for example, the inner extension portion 302 has a certain size in a direction perpendicular to the central axis, so as to arrange the glue material.

According to another embodiment of the present application, a camera module is also provided, and the camera module can include the optical camera lens of any one of the aforementioned embodiments.

According to another embodiment of the present application, an optical camera lens assembly method is also provided, which includes the following steps.

S100, mounting a second lens group in an integrated lens barrel to constitute a second camera lens component, wherein the integrated lens barrel includes a cylindrical body and an inner extension portion, the cylindrical body has an inner side surface and a central axis, the inner extension portion extends inwardly from the inner side surface and the middle of the inner extension portion has a light through hole, the inner extension portion divides the inner side surface into a first section and a second section, wherein the top surface of the inner extension portion and the first section forms a first groove, the bottom surface of the inner extension portion and the second section forms a second groove, the second lens group includes at least one second lens, the second lens group bears against the bottom surface of the inner extension portion and is placed in the second groove;

S200, placing the first lens group in the first groove, wherein the first lens group includes a single first lens or multiple first lenses assembled together by an interaction of the lenses themselves;

S300, pre-positioning the first lens group and the second camera lens component so that the first lens group and the second lens group constitute an imageable optical system;

S400, actively calibrating a relative position of the first lens group and the second lens group based on an actual measurement imaging results; and S500, bonding the first lens group and the first groove by a first glue material, and making the relative position of the first lens group and the second lens group to be maintained at the relative position determined by the active calibration, thereby obtaining the optical camera lens.

Further, in one embodiment, the first section 3011 has a closed ring shape in a top view, at the time of pre-positioning the first lens group and the second camera lens component in step S300 and actively calibrating a relative position of the first lens group and the second lens group based on an actual measurement imaging results in S400, the first lens group 100 is clamped by a clamp to move, wherein there is a gap between the first section 3011 and the side surface of the first lens group 100 for accommodating the clamp.

Further, in one embodiment, the first section 3011 has a notched ring shape in a top view, at the time of pre-positioning the first lens group and the second camera lens component in step S300 and actively calibrating a relative position of the first lens group and the second lens group based on an actual measurement imaging results in S400, the first lens group 100 is clamped by a clamp to move, wherein the clamp stretches into the integrated lens barrel 300 through the notch and clamps the first lens group 100.

Further, in one embodiment, the second section 3012 has multiple steps, and at the time of mounting the second lens group 200 in the integrated lens barrel 300 in step S100, the at least one second lens are sequentially embedded to the multiple steps to assemble the second lens group 200, and the second camera lens component is formed.

Further, in one embodiment, at the time of bonding the first lens group 100 and the first groove by a first glue material 400 in step S500, the first glue material 400 is only arranged between a bottom surface of the first lens group 100 and the top surface of the inner extension portion 302. In another embodiment, in step S500, the first glue material 400 is not only arranged between the bottom surface of the first lens group 100 and the top surface of the inner extension portion 302, but also arranged between the side surface of the first lens group 100 and the first section 3011.

Further, in one embodiment, the assembly method further includes step S600.

S600, adhering a light shielding plate 500 to a top surface of the first lens group 100, wherein no glue material is filled between the light shielding plate 500 and a top surface of the cylindrical body 301. In this embodiment, after the step (S500) of bonding the first lens group 100 and the first groove by the first glue material 400 is completed, the step (S600) of adhering the light shielding plate 500 can be performed.

In another embodiment, the step S600 can be replaced with S600'.

S600', adhering a light shielding plate 500 to a top surface of the cylindrical body 301, wherein no glue material is filled between the light shielding plate 500 and a top surface of the first lens group 100. In this embodiment, after the step (S500) of adhering the first lens group 100 and the first groove by the first glue material 400 is completed, the step (S600') of adhering the light shielding plate 500 can be performed.

Further, in one embodiment, step S500 can include glue arranging, exposure and baking performed successively, and adhering the light shielding plate 500 can be performed after exposure and before baking. Wherein glue arranging is to arrange the first glue material 400 on the top surface of the inner extension portion 302, and exposure is to trigger the curing reaction of the first glue material 400 by ultraviolet light (or other wavelength bands of light), so that the first glue material 400 can temporarily support and fix a relative position of a first camera lens component and the second camera lens component (that is, the relative position of the first lens group 100 and the integrated lens barrel 300). Baking is to put the optical camera lens temporarily supported and fixed into an oven (or other equipments) for baking, so that the first glue material 400 is permanently cured, thereby improving the structural strength and reliability of the optical camera lens.

Further, according to another embodiment of the present application, there is also provided an assembly method of camera module, which includes assembling an optical camera lens using the assembly method of optical camera lens of any of the aforementioned embodiments, and then mounting the assembled optical camera lens on the photosensitive assembly, to obtain a finished camera module.

In this description, the concepts of lens barrel, integrated lens barrel, first lens barrel, second lens barrel and so on all refer to a lens barrel as a black object, and these lens barrels all have a light shielding effect.

In the present application, the integrated lens barrel 300 can be mounted in an optical actuator (for example, a motor). For example, the integrated lens barrel 300 can be mounted on the inner side surface of the motor carrier, thereby forming a whole with the motor. During active calibration, the first lens group 100 serves as one component (can be regarded as the first camera lens component), and the second lens group 200, the integrated lens barrel 300 and a motor serve as another component (can be regarded as the second camera lens component), the active calibration is performed between the two camera lens components.

The following will further introduce the active calibration process used in the assembly method of optical camera lens or camera module.

Figure 14A:
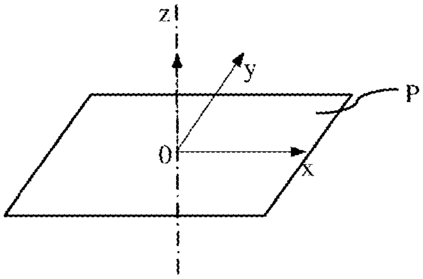
FIG. 14A shows a relative position adjustment manner in an active calibration in one embodiment of the present application.

Further, the active calibration described in the present application can adjust the relative position of the first camera lens component 100 and the second camera lens component 200 at multiple degrees of freedom. FIG. 14A shows a relative position adjustment manner in an active calibration in one embodiment of the present application. In this adjustment manner, the first camera lens component 100 (or the first lens 101) can move along the x, y, and z directions relative to the second camera lens component 200 (that is, the relative position adjustment in this embodiment has three degrees of freedom). Wherein the z direction is the direction along the optical axis, and the x and y directions are the directions perpendicular to the optical axis. The x and y directions are both in an adjustment plane P, and a translation in the adjustment plane P can be decomposed into two components in the x and y directions.

Figure 14B:
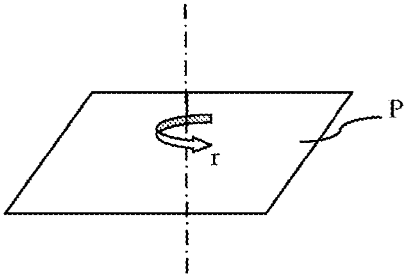
FIG. 14B shows a rotation adjustment in an active calibration in another embodiment of the present application.

FIG. 14B shows a rotation adjustment in an active calibration in another embodiment of the present application. In this embodiment, in addition to the three degrees of freedom in FIG. 14A, the relative position adjustment is further added with a degree of freedom in rotation, that is, an adjustment in a r direction. In this embodiment, the adjustment in the r direction is the rotation in the adjustment plane P, that is, the rotation around an axis perpendicular to the adjustment plane P.

Figure 14C:
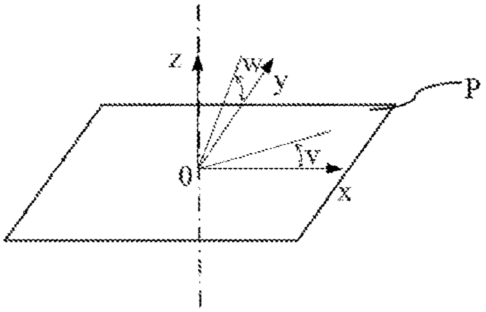
FIG. 14C shows a relative position adjustment manner added with adjustment in v and w directions in an active calibration in another embodiment of the present application.

Further, FIG. 14C shows a relative position adjustment manner added with adjustment in v and w directions in an active calibration in another embodiment of the present application. Wherein, the v direction represents a rotation angle of the xoz plane, and the w direction represents a rotation angle of the yoz plane, the rotation angles of the v direction and the w direction can be combined into a vector angle, and this vector angle represents a total tilt state. That is to say, by adjusting the v and w directions, a tilt posture of the first camera lens component relative to the second camera lens component can be adjusted (that is, a tilt of the optical axis of the first camera lens component relative to the optical axis of the second camera lens component).

The adjustment of the six degrees of freedom of x, y, z, r, v, and w may all affect the imaging quality of the optical system (for example, affect the magnitude of the resolution). In other embodiments of the present application, the relative position adjustment manner can be to adjust only any one of the above six degrees of freedom, or a combination of any two or more of them.

Further, in one embodiment, in the active calibration step, the adjustment of the relative position of the first camera lens component and the second camera lens component includes a translation on the adjustment plane, that is, the movements in the x, y directions.

Further, in one embodiment, in the active calibration step, the adjustment of the relative position of the first camera lens component and the second camera lens component further includes: adjusting and determining an included angle between the axis of the first camera lens component and the axis of the second camera lens component according to an actual measured resolution of the optical system, that is, the adjustment in the w and v directions. In the assembled optical camera lens or camera module, the included angle between the axis of the first camera lens component and the axis of the second camera lens component can be non-zero.

Further, in one embodiment, in the active calibration step, the adjustment of the relative position of the first camera lens component and the second camera lens component further includes: moving the first camera lens component along a direction perpendicular to the adjustment plane (that is, adjustment in the z direction), according to the actual measured resolution of the optical system, determining the relative position between the first camera lens component and the second camera lens component in the direction perpendicular to the adjustment plane.

Further, in one embodiment, the first camera lens component may also not have a first lens barrel. For example, the first camera lens component can be composed of a single first lens. Before the active calibration, pre-positioning is first performed so that there is a gap between a bottom surface of the first lens and a top surface of the second camera lens component; then the active calibration is performed, and then the glue material is arranged in the gap and the glue material is cured. In this embodiment, the first lens can be formed by multiple sub-lenses that are integrated or bonded with each other to form a whole. In this embodiment, a side surface and a top surface of a non-optical surface of the first lens that are not used for imaging can form a light shielding layer 101. The light shielding layer 101 can be formed by screen printing a light shielding material on the side and top surface of the first lens. Compared with the scheme of the embodiment with an upper cover and a split lens barrel (black object), this embodiment can reduce the size of the camera module head (on the object side) that originally encroached on the screen of the mobile phone, so that when the camera module is mounted in the mobile phone, it can be closer to the side wall (or other frame) of the mobile phone to achieve a higher screen-to-body ratio.

Further, still referring to FIG. 1, in one embodiment, the top surface of the structural region 103 of the first lens group 100 is higher than the top surface of the integrated lens barrel 300. Wherein, the top surface refers to an end surface on a side of an object. This design can make the top surface of the lens barrel lower than the top surface of the lens, in this way, when the camera module is mounted in the mobile phone, the lens barrel as a structural member has a smaller protrusion, and the size of the encroachment on the screen is smaller, which is beneficial to increase the screen-to-body ratio. For example, when the camera module is used as a front camera, the lower top surface of the lens barrel helps avoid screen assemblies, so that the screen extends closer to the frame of the mobile phone, thereby increasing the screen-to-body ratio.

in the active calibration step, the second camera lens component can be fixed, the first camera lens component can be clamped by a clamp, and the first camera lens component can be moved under a drive of a six-axis motion mechanism connected with the clamp, thereby realizing the relative movement between the first camera lens component and the second camera lens component in the above six degrees of freedom. Wherein the clamp can be leaned against or partially leaned against the side surface of the first camera lens component, thereby clamping the first camera lens component and performing position adjustment of multiple degrees of freedom.

The above description is only preferred embodiments of this application and an explanation of the applied technical principles. Those skilled in the art should understand that the scope of the application involved in this application is not limited to the technical solutions formed by the specific combination of the above technical features, and should also cover other technical solutions formed by any combination of above technical features and its equivalent features without departing from the concept of the application. For example, the above-mentioned features and the technical features disclosed in this application (but not limited to) with similar functions are mutually replaced to form a technical solution.

The invention claimed is:

1. An optical camera lens, characterized by comprising:

an integrated lens barrel, comprising:

a cylindrical body having an inner side surface and a central axis; and an inner extension portion, wherein the inner extension portion extends inward from the inner side surface and the middle of the inner extension portion has a light through hole, and the inner extension portion divides the inner side surface into a first section and a second section, and a top surface of the inner extension portion and the first section form a first groove, and a bottom surface of the inner extension portion and the second section form a second groove, and the first section has a notch that penetrates a body of the first section and extends from bottom to top of the first section in a direction parallel to the central axis;

a first lens group including a single first lens or multiple first lenses assembled together by integrating or bonding between the multiple lenses, wherein the notch is configured to completely expose a side of the first lens group in a direction perpendicular to the central axis, and there is a gap between the inner side surface of the first section and an outer side surface of the first lens group;

a second lens group including at least one second lens, the second lens group bearing against the bottom surface of the inner extension portion and being placed in the second groove, and the first lens group and the second lens group together forming an imageable optical system;

a first glue material located between a lower surface of the first lens group and the top surface of the inner extension portion; and a second glue material located between a lower surface of a light shielding plate and a top surface of the cylindrical body, wherein the first section has a ring shape with the notch in a top view, the top surface of the cylindrical body is bonded with the light shielding plate by the second glue material, the light shielding plate forms a diaphragm, and no glue material is filled between the light shielding plate and the first lens group.

2. The optical camera lens of claim 1, wherein the cured first glue material supports and fixes the first lens group and the integrated lens barrel, so that a relative position of the first lens group and the second lens group is maintained at a relative position determined by an active calibration based on an imaging result of the optical system.

3. The optical camera lens of claim 1, wherein the first lens group includes an optical region and a structural region surrounding the optical region.

4. The optical camera lens of claim 3, wherein the light shielding plate has a side baffle that fits the notch.

* * * * *